(12) United States Patent
Torni et al.

(10) Patent No.: US 12,180,008 B2
(45) Date of Patent: Dec. 31, 2024

(54) CONVEYING APPARATUS FOR CONVEYING FOOD PRODUCTS AND HEAT TREATMENT APPARATUS

(71) Applicant: PAVAN S.p.A., Galliera Veneta (IT)

(72) Inventors: Davide Torni, Galliera Veneta (IT); Jürgen Spatz, Galliera Veneta (IT)

(73) Assignee: PAVAN S.p.A., Galliera Veneta (IT)

( * ) Notice: Subject to any disclaimer, the term of this patent is extended or adjusted under 35 U.S.C. 154(b) by 0 days.

(21) Appl. No.: 18/696,017

(22) PCT Filed: Nov. 28, 2022

(86) PCT No.: PCT/IB2022/061490
§ 371 (c)(1),
(2) Date: Mar. 27, 2024

(87) PCT Pub. No.: WO2023/135463
PCT Pub. Date: Jul. 20, 2023

(65) Prior Publication Data
US 2024/0262630 A1  Aug. 8, 2024

(30) Foreign Application Priority Data
Jan. 17, 2022 (IT) ......... 102022000000650

(51) Int. Cl.
*B65G 17/06* (2006.01)
*B65G 17/12* (2006.01)
(Continued)

(52) U.S. Cl.
CPC ......... *B65G 17/067* (2013.01); *B65G 17/123* (2013.01); *B65G 17/18* (2013.01);
(Continued)

(58) Field of Classification Search
CPC .... B65G 17/067; B65G 17/12; B65G 17/123; B65G 17/16; B65G 17/18; B65G 17/36;
(Continued)

(56) References Cited

U.S. PATENT DOCUMENTS 2,664,592 A * 1/1954 Harold ................. B65G 17/067
198/708
3,034,636 A * 5/1962 Manna ................. B65G 17/067
198/798
(Continued)

FOREIGN PATENT DOCUMENTS

JP  S50-024790 U  3/1975
JP  S60-196160 A  10/1985
(Continued)

OTHER PUBLICATIONS

International Search Report and Written Opinion issued for PCT/IB2022/061490 (ISA/EP) mailed Mar. 24, 2023 (11 pages).
International Preliminary Report on Patentability issued for PCT/IB2022/061490 (IPEA/EP) Aug. 3, 2023 (25 pages).

*Primary Examiner* — Mark A Deuble
(74) *Attorney, Agent, or Firm* — ALSTON & BIRD LLP (57) ABSTRACT

A conveying apparatus (1) for conveying food products, comprising: a conveyor (2) developing along a closed conveying path (3), said conveyor (2) comprising a first and second endless chain (4, 5) arranged parallel to each other: a plurality of containers (6) transversally mounted between said first and second endless chain (4, 5), each container (6) comprising: —at least one cup-shaped receptacle (8) for a food product: —a first pin (9) and a second pin (10) protruding respectively from opposite ends of the container (6); a plurality of pairs of supports (11, 12), each pair being formed by a first support (11) mounted on the first endless chain (4) and a second support (12) mounted on the second endless chain (5), each support (11, 12) having a bore (13) dimensioned and shaped for receiving one of said pins (9, (Continued)

10), the first pin (9) and the second pin (10) of each container (6) being removably mounted within the bores (13) of one pair of supports (11, 12).

14 Claims, 6 Drawing Sheets

(51) Int. Cl.
  B65G 17/18 (2006.01)
  B65G 17/36 (2006.01)
  B65G 17/42 (2006.01)
(52) U.S. Cl.
  CPC ............ B65G 17/36 (2013.01); B65G 17/42 (2013.01); *B65G 2201/0202* (2013.01)
(58) Field of Classification Search
  CPC .................. B65G 17/365; B65G 17/42; B65G 2201/0202
  See application file for complete search history.

(56) References Cited

U.S. PATENT DOCUMENTS

| | | | | |
|---|---|---|---|---|
| 4,166,139 | A * | 8/1979 | Ishida | A23L 7/111 |
| | | | | 426/115 |
| 4,234,612 | A * | 11/1980 | Sakakibara | A47J 37/1214 |
| | | | | 99/404 |
| 4,254,696 | A * | 3/1981 | Ohtake | A47J 37/1214 |
| | | | | 99/450 |
| 6,129,939 | A * | 10/2000 | Fink | A23L 5/12 |
| | | | | 426/496 |
| 9,004,272 | B2 * | 4/2015 | Ackley, Jr. | B65G 17/063 |
| | | | | 198/689.1 |
| 9,828,122 | B2 * | 11/2017 | Navarro Rosales | B65B 43/46 |
| 11,490,642 | B2 * | 11/2022 | Kitano | A23L 5/11 |

FOREIGN PATENT DOCUMENTS

| | | |
|---|---|---|
| JP | H05-058426 A | 3/1993 |
| JP | 6800547 B2 | 12/2020 |

* cited by examiner

CONVEYING APPARATUS FOR CONVEYING FOOD PRODUCTS AND HEAT TREATMENT APPARATUS

CROSS REFERENCE TO RELATED APPLICATIONS

This application is a National Stage Application, filed under 35 U.S.C. § 371, of International Application No. PCT/IB2022/061490, filed Nov. 28, 2022, which claims priority to Italy Application No. 102022000000650, filed Jan. 17, 2022; the contents of both of which are hereby incorporated by reference in their entirety.

BACKGROUND

Related Field

The present invention relates to a conveying apparatus for conveying food products and a heat treatment apparatus. The present invention finds application in the food industry, in particular to convey food products through treatment apparatus, such as fryer, oven, etc.

Description of Related Art

In a known type of conveying apparatus, food products are placed inside a plurality of cup-shaped receptacles arranged in rows, which are moved along a predefined path by a chain conveyor.

An example of this known technology can be found in document U.S. Pat. No. 4,166,139 A in which noodles are cupped and transported in a frying unit. The predefined path usually comprises a plurality of curves and height changes with respect to the floor.

In designing the conveyor there is felt the need to reach a compromise between diverging goals.

On one side, there is felt the need for reducing the empty space between the rows of the cup-shaped receptacles.

On the other end, the distance between the rows serves to avoid the risk of collision during the rotation around the sprocket wheels. Thus, a gap between the rows is generally guaranteed in the prior art solutions.

BRIEF SUMMARY

In this context, the technical task underlying the present invention is to propose a conveying apparatus for conveying food products and a heat treatment apparatus which overcome the drawbacks in the prior art as described above.

In particular, an object of the present invention is to provide a conveying apparatus for conveying food products, which allows containers to be kept close together while avoiding the risk of collision.

Another object of the present invention is to propose a conveying apparatus and a heat treatment apparatus able to convey and heat food products having diameter in the order of about one millimetre.

The stated technical task and specified objects are substantially achieved by a conveying apparatus for conveying food products, comprising:
  a conveyor developing along a closed conveying path, said conveyor comprising a first and second endless chain arranged parallel to each other;
  a plurality of containers transversally mounted between said first and second endless chain, each container comprising:
    at least one cup-shaped receptacle for a food product;
    a first pin and a second pin protruding respectively from opposite ends of the container;
    a plurality of pairs of supports, each pair being formed by a first support mounted on the first endless chain and a second support mounted on the second endless chain, each support having a bore dimensioned and shaped for receiving one of said pins, the first pin and the second pin of each container being removably mounted within the bores of one pair of supports.

According to one embodiment, the first pin and the second pin of each container are slidably mounted within the bores of one pair of supports.

According to one embodiment, the first pin and the second pin of each container are axially rotatably mounted within the bores of one pair of supports.

According to one embodiment, the extension of each bore is larger than the cross-section of the pins.

According to one embodiment, the bore has an elongated development in a direction that is inclined with respect to a transport direction of the conveyor.

According to one embodiment, the bore has an elongated development in a direction substantially orthogonal to the transport direction of the conveyor.

According to one embodiment, the first pin of each container is axially retractable with respect to the corresponding container.

Preferably, the conveyor comprises a plurality of sprockets on which the endless chains are mounted. The conveyor comprises first guiding means arranged at least at one sprocket and configured to engage the pins of each container and keep them outside the pitch diameter of the sprocket during the rotation of the container around the sprocket.

According to one embodiment, the cup-shaped receptacle comprises a perforated sheet with a plurality of through-holes, the perforated sheet being arranged to define a bottom of the cup-shaped receptacle for resting the food product.

Preferably, the through-holes have a diameter of between 0.5 and 3 mm.

Preferably, the ratio between empty and full spaces of the perforated sheet is between 0.30÷0.70.

According to one embodiment, the cup-shaped receptacle comprises a lateral wall comprising a first plate and a second plate arranged so as to partially overlap in an overlapping zone in correspondence of the bottom.

Preferably, the first plate and second plate are mutually shaped in the overlapping zone so that they create an inner recess for holding the bottom.

Preferably, in cross-section the second plate is S-shaped with a first end developing outwards which, together with a free end of the first plate, defines the inner recess.

According to one embodiment, each container comprises a plurality of cup-shaped receptacles arranged in a row along a transverse direction that is orthogonal to a transport direction of the conveyor.

The stated technical task and specified objects are substantially achieved by a heat treatment apparatus for food products, in particular noodles, comprising:
  a heating chamber;
  a conveying apparatus according to what is described.

The conveyor of the conveying apparatus is arranged to partly pass through the heating chamber.

According to one embodiment, the heat treatment apparatus further comprises a first air injecting device configured to introduce into a first part of the heating chamber an upper air flow towards the noodles arranged in the cup-shaped receptacles, the upper air flow having a temperature that is comprised between 100° C. and 300° C. and being directed from a first zone above the conveyor to a second zone under the conveyor.

The heat treatment apparatus further comprises a second air injecting device configured to introduce into a second part of the heating chamber a lower air flow towards the noodles arranged in the cup-shaped receptacles, the lower air flow having a temperature that is comprised between 100° C. and 300° C. and being directed from the second zone to the first zone.

BRIEF DESCRIPTION OF THE FIGURES

Additional features and advantages of the present invention will become more apparent from the non-limiting, description of a preferred, but non-exclusive embodiment of a conveying apparatus for conveying food products, as illustrated in the appended drawings, in which.

DETAILED DESCRIPTION OF VARIOUS EMBODIMENTS

With reference to the figures, number 1 indicates a conveying apparatus for conveying food products.

For example, food products may be portions (or blocks) of noodles that are to be pre-cooked for obtaining instant noodles.

The conveying apparatus 1 comprises a conveyor 2 developing along a closed conveying path 3.

The conveyor 2 is configured to transport the food products in a transport direction D.

The conveyor 2 comprises a first and second endless chain 4, 5 arranged parallel to each other. The two endless chains 4, 5 are so arranged like rails.

The conveying apparatus 1 comprises a plurality of containers 6 transversally mounted between the first and second endless chains 4, 5.

Each container 6 comprises at least one cup-shaped receptacle 8 for the food product.

Preferably, the container 6 comprises a plurality of cup-shaped receptacles 8 arranged in a row along a direction transverse to the conveying path 3.

In other words, each container 6 of cup-shaped receptacles 8 has an elongated extension that develops substantially in a transverse direction T between the two endless chains 4, 5.

The transverse direction T is substantially orthogonal to the transport direction D.

The cup-shaped receptacles 8 may have any suitable shape, depending on the food product.

According to the embodiment here described and illustrated, each cup-shaped receptacle 8 is arranged in a corresponding opening obtained in the container 6 and welded to it.

According to another embodiment (not illustrated), each cup-shaped receptacle 8 is removably mounted in a corresponding opening obtained in the container 6.

According to another embodiment (not illustrated), the cup-shaped receptacles 8 are obtained by shaping the container 6.

Figure 6:
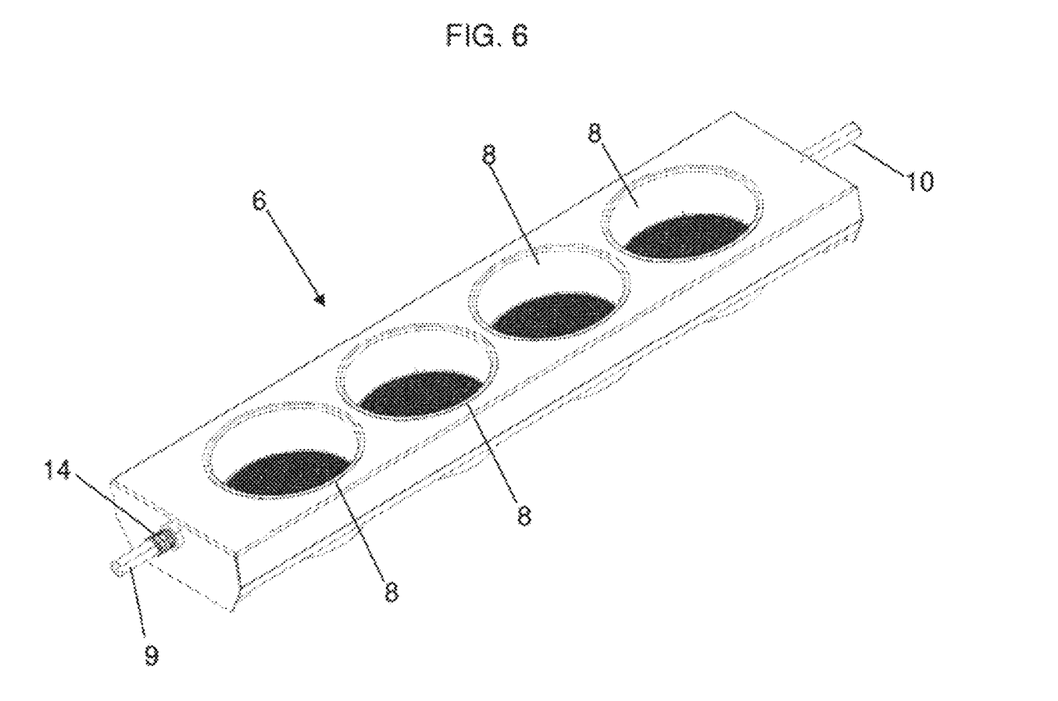
FIG. 6 illustrates a perspective view of a container of the conveying apparatus of FIG. 1.

Each container 6 comprises a first pin 9 and a second pin 10 protruding respectively from opposite ends of the container 6.

Preferably, the first pin 9 and the second pin 10 develop parallel to the transverse direction T.

The conveyor 2 further comprises a plurality of first supports 11 and second supports 12 mounted along the two endless chains 4, 5.

Preferably, the first supports 11 and the second supports 12 are arranged in pairs. The first support 11 and the second support 12 of a pair are located respectively on the first endless chain 4 and on the second endless chain 5, substantially opposite one another with respect to the transport direction D.

In particular, the first support 11 and the second support 12 of a pair are arranged in the inner side of the endless chains 4, 5.

Each support 11, 12 has a bore 13 facing towards the opposite chain 4, 5. In other words, the bore 13 faces towards the container 6.

In practice, the bore 13 faces inward.

Originally, each container 6 is removably mounted in a pair of supports 11, 12.

In particular, the pins 9, 10 of the container 6 are removably mounted in the bores of said supports 11, 12.

In particular, the first pin 9 and the second pin 10 of the container 6 are slidably mounted respectively in the bore 13 of the first support 11 and in the bore 13 of the second support 12.

Preferably, the first pin 9 and the second pin 10 of the container 6 are also rotatably mounted respectively in the bore 13 of the first support 11 and in the bore 13 of the second support 12.

The rotation referred to is with respect to an axial direction of the pin 9, 10, that is the transverse direction T of the container 6.

In particular, the extension of each bore 13 is larger than the cross-section of the pins 9, 10 so that there is a tolerance gap that allows the pins 9, 10 to move within the bores 13.

According to the embodiment illustrated herewith, each bore 13 has an elongated development in a direction inclined both with respect to the transport direction D and to the transverse direction T.

Preferably, each bore 13 has an elongated development in a direction that is orthogonal both to the transport direction D and to the transverse direction T.

Preferably, each bore 13 has an elongated development in a direction having a vertical component.

In other words, the bore 13 is a linear-elongated slot.

In other words, the bore 13 has the shape of a seat for a mechanical feather key, i.e. rectangular with two rounded opposite sides.

In another embodiment (not illustrated), each bore 13 has a round shape with a diameter that is higher than the diameter of the cross-section of the pins 9, 10.

Each bore 13 may be a through-hole or a blind hole.

Thanks to the sliding mounting, the pins 9, 10 are free to move in the bores 13. This allows to create a conveying path 3 with changes in direction and height, despite the containers 6 being mounted close to each other.

The containers 6 are indeed kept away from the others even in changes of direction such as curves, thus avoiding collisions.

According to one embodiment, the first pin 9 is axially slidable with respect to the container 6. Thus, the container 6 can be easily removed from its supports 11, 12 without the use of any tool.

In this case, a spring 14 is provided on the first pin 9.

In particular, the first pin 9 is axially retractable inside the container 6.

According to a preferred embodiment, the conveying path 3 comprises a plurality of changes of direction. In particular, the change of direction is a curve.

Figure 1:
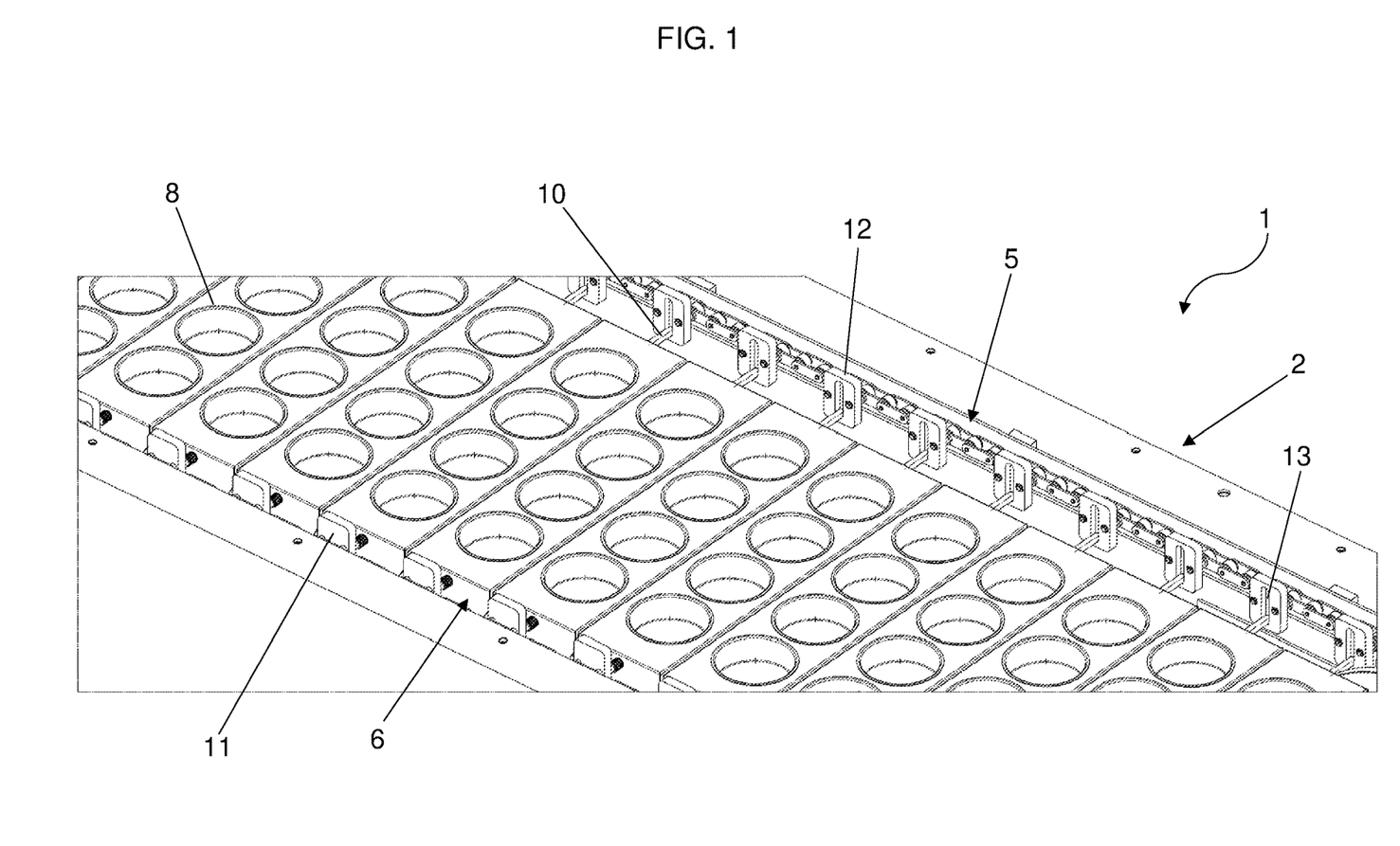
FIG. 1 illustrates a part of a conveying apparatus for conveying food products, according to the present invention, in a perspective view.
Figure 2:
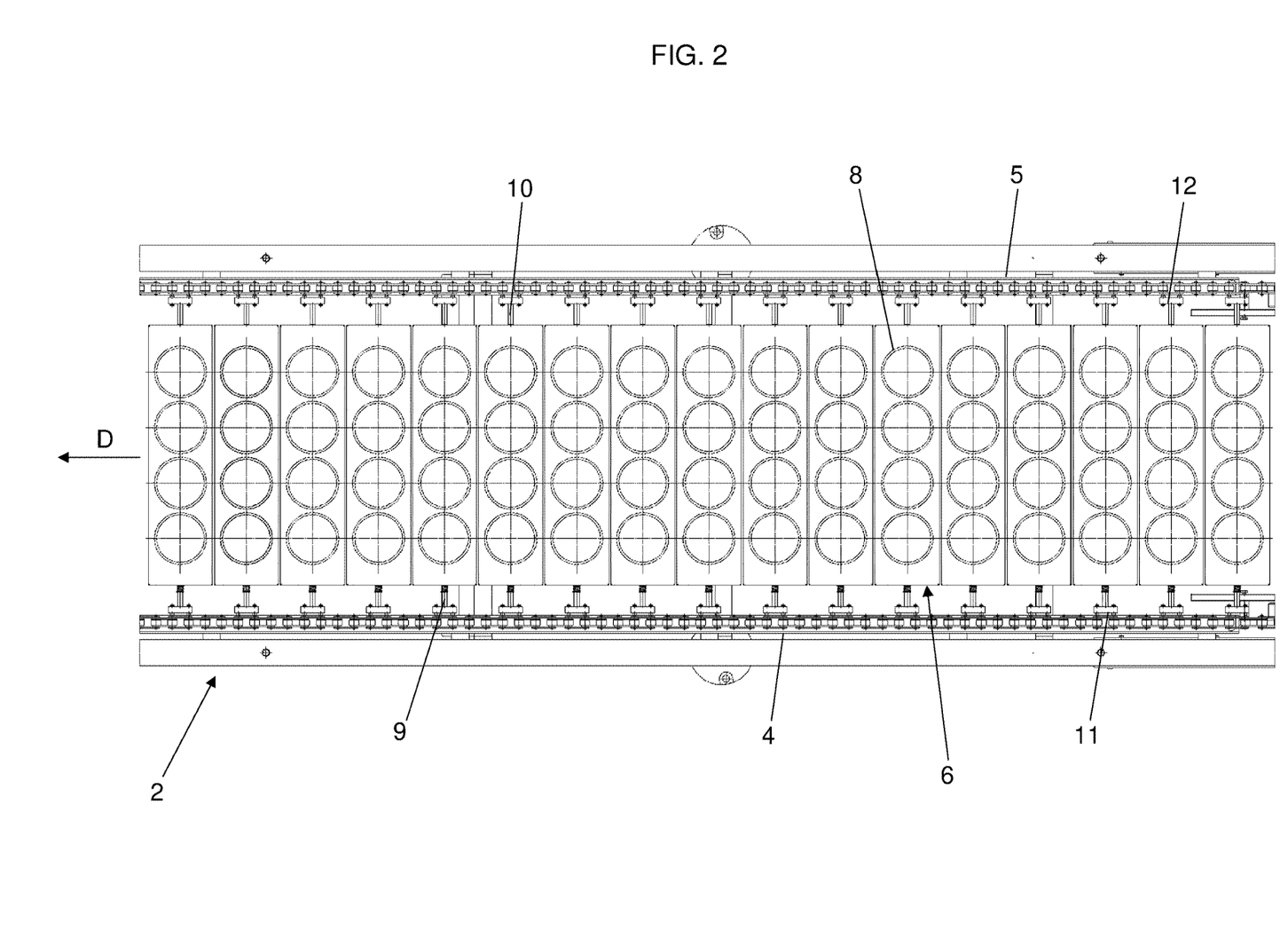
FIG. 2 illustrates a top view of the conveying apparatus of FIG. 1.
Figure 3:
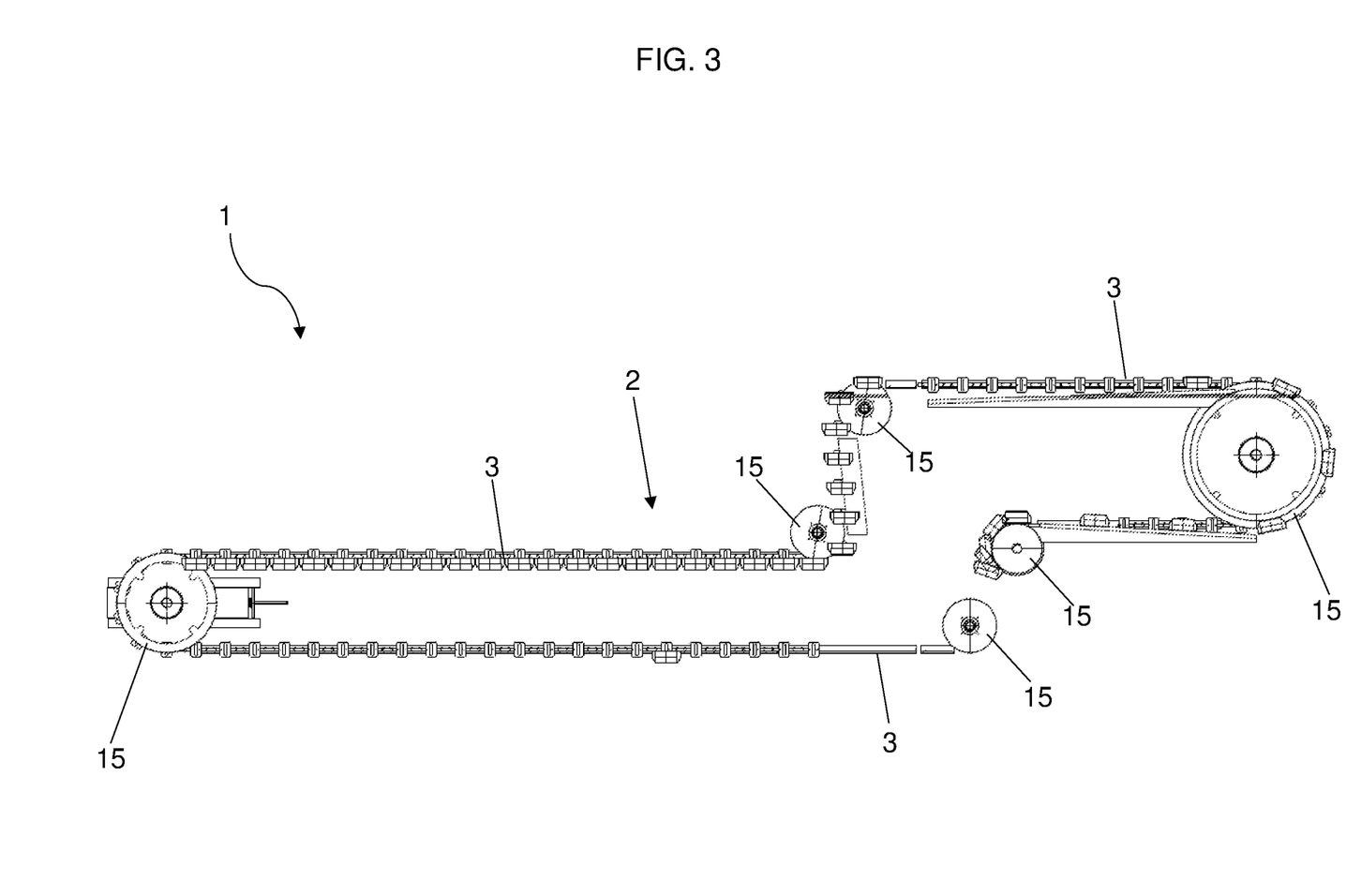
FIG. 3 illustrates a schematic lateral view of the conveying apparatus of FIG. 1.

Preferably, as illustrated in FIG. 3, the conveying path 3 develops over several heights. In this case, the curves involve a change in height.

The conveyor 2 comprises a plurality of sprockets 15 on which the endless chains 4, 5 are mounted so as to create the curves of the conveying path 3.

Preferably, the conveying apparatus 1 comprises first guiding means 16 arranged at least one sprocket 15 and configured to engage the pins 9, 10 of a container 6 and keep them outside the pitch diameter of the sprocket 15. In this way, during the rotation of a container 6 around a sprocket 15, it is kept away from other containers and thus collision is avoided.

Preferably, the first guiding means 16 are arranged at a plurality of sprockets 15.

Figure 4:
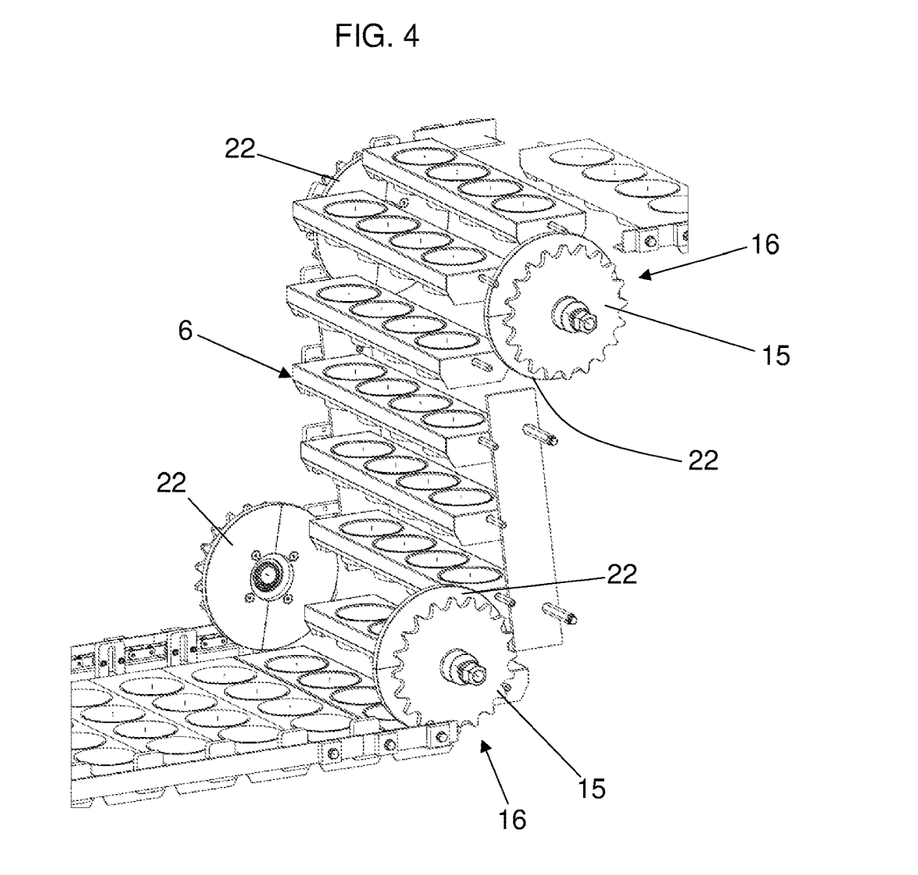
FIGS. 4 and 5 illustrate two different parts (in particular, curves and sprockets) of the conveying apparatus of FIG. 1, in a perspective view.

According to the embodiment here described and illustrated in FIG. 4, the first guiding means 16 comprise two shaped profiles of a first type 22 arranged at two opposite sides of the sprocket 15. Each shaped profile of the first type 22 engages one of the pins 9,10. The shaped profile of the first type 22 is shaped so as to keep the pin 9, 10 outside the pitch diameter of the sprocket 15.

In other words, the shaped profile of the first type 22 is a cam. The cam may be either fixed or rotatable with the sprocket 15.

Preferably, the conveying apparatus 1 comprises second guiding means 23 arranged at least one sprocket 15 and configured to engage the container 6 and turning it upside down.

The rotational mounting allows the pins 9, 10 to be free to rotate along their longitudinal axes (i.e. the transverse direction T), thus allowing the inversion upside down of the container 6, for example to discharge the food product.

Figure 5:
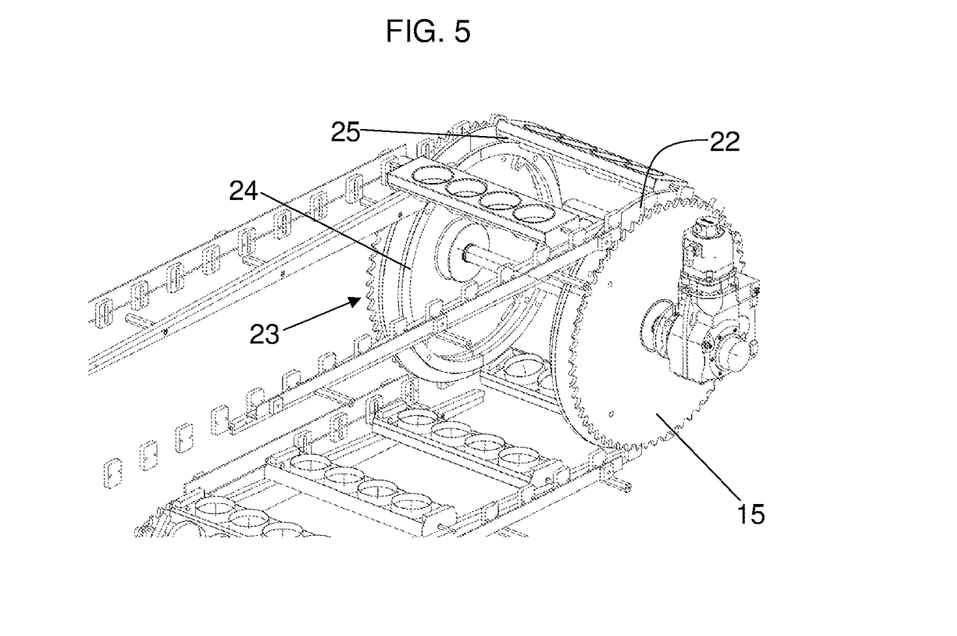

According to the embodiment here described and illustrated in FIG. 5, the second guiding means 23 comprise two shaped profiles of a second type 24 arranged at two opposite sides of the sprocket 15. Each shaped profile of the second type 24 engages a corresponding protuberance 25 on the container 6. The shaped profile of the second type 24 is shaped so as to make the container 6 turn upside down.

In other words, the shaped profile of the second type 24 is a cam. The cam may be either fixed or rotatable with the sprocket 15.

The first and second guiding means 16, 23 may be arranged at the same sprocket 15.

According to the embodiment here described and illustrated, each cup-shaped receptacle 8 comprises a perforated sheet 17 with a plurality of through-holes 18. The perforated sheet 17 is arranged to define a bottom 8a of the cup-shaped receptacle 8 for resting the food product.

The through-holes 18 have a diameter less than or at most equal to the size of the food product so as to prevent it from falling out. Preferably, the through-holes 18 have a diameter of between 0.5 mm and 3 mm.

The shape of the through-holes 18 is not strictly circular. In case of non-circular shape, the diameter of the through-holes 18 mentioned above is intended to be the diameter of the inscribed circle.

Preferably, the through-holes 18 have a hexagonal shape.

Preferably, the ratio between empty and full spaces of the perforated sheet 17 is between 0.30 and 0.70. More preferably, the ratio is between 0.38 and 0.60.

Each cup-shaped receptacle 8 comprises a lateral wall 8b and the bottom 8a previously described. The lateral wall 8b has a rounded and closed development, i.e. cylindrical or frustoconical.

In particular, the lateral wall 8b is composed by a first plate 19 and a second plate 20 arranged so as to partially overlap in an overlapping zone in correspondence of the bottom 8a.

The first plate 19 and the second plate 20 are mutually shaped in the overlapping zone so that they create an inner recess 21 for holding the bottom 8a.

According to one embodiment, in cross-section the second plate 20 is S-shaped with a first end 20a developing outwards which, together with a free end 19a of the first plate 19, defines the inner recess 21.

Figure 7:
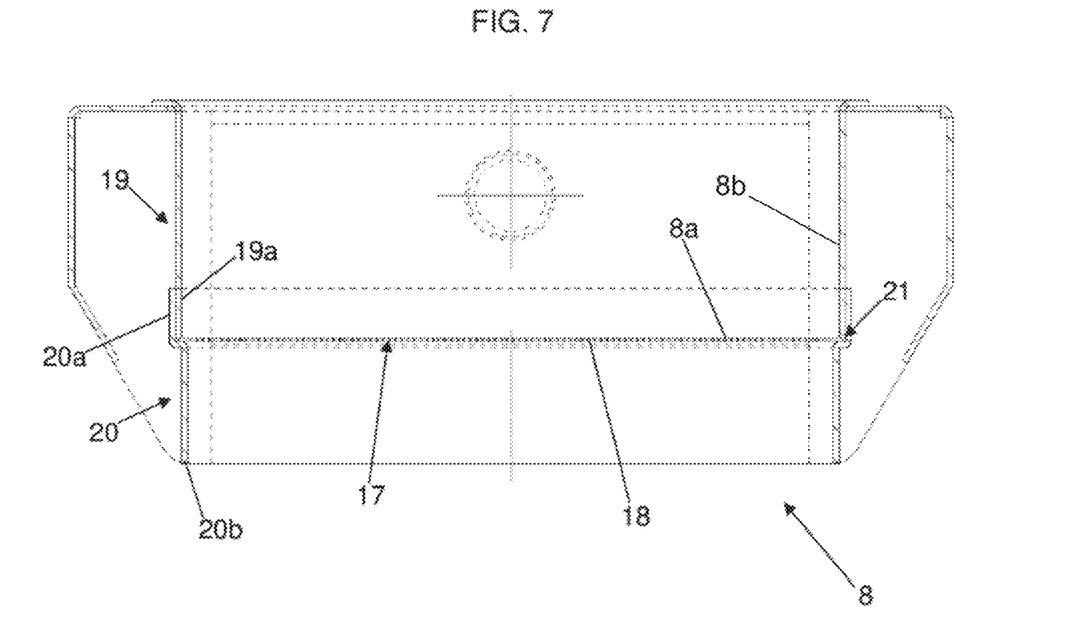
FIG. 7 illustrates a cross-sectional view of the container of FIG. 6.

Preferably, as illustrated in FIG. 7, in cross-section the first lateral plate 19 has a straight free end 19a.

According to a preferred embodiment, the S-shaped of the second plate 20 is defined by a change in curvature from the first end 20a, developing outwards and a second end 20b developing inward.

In particular, the first end 20a is superimposed out of the free end 19a of the first plate 19, while the second end 20b turns inwards, i.e. it has more internal position than the free end 19a of the first plate 19.

Preferably, the first end 20a is welded at the free end 19a of the first plate 19.

A peripheral edge of the perforated sheet 17 is held in the inner recess 21. Thus, the perforated sheet 17 is mechanical interlocked to the lateral wall 8b. No welding is used for the perforated sheet 17.

Indeed, the sheet 17 is micro-perforated. Welding is not achievable on thin sheets without damaging them. Therefore, the solution described above is advised when using thin sheets, for example having thickness of 1 mm or less. Nevertheless, micro-perforation and the mounting arrangement can be used for sheets 17 with any thickness (for example, sheets with thickness of 15 mm).

The thickness of the sheet 17 must be inferior to the diameter of the through-holes 18.

Accordingly, the cup-shaped receptacles 8 have a total height that is always the same, whereas the height of the bottom 8a may be varied depending on the type of product. This is achieved by varying the length of the second end 20b of the second plate 20.

Figure 8:
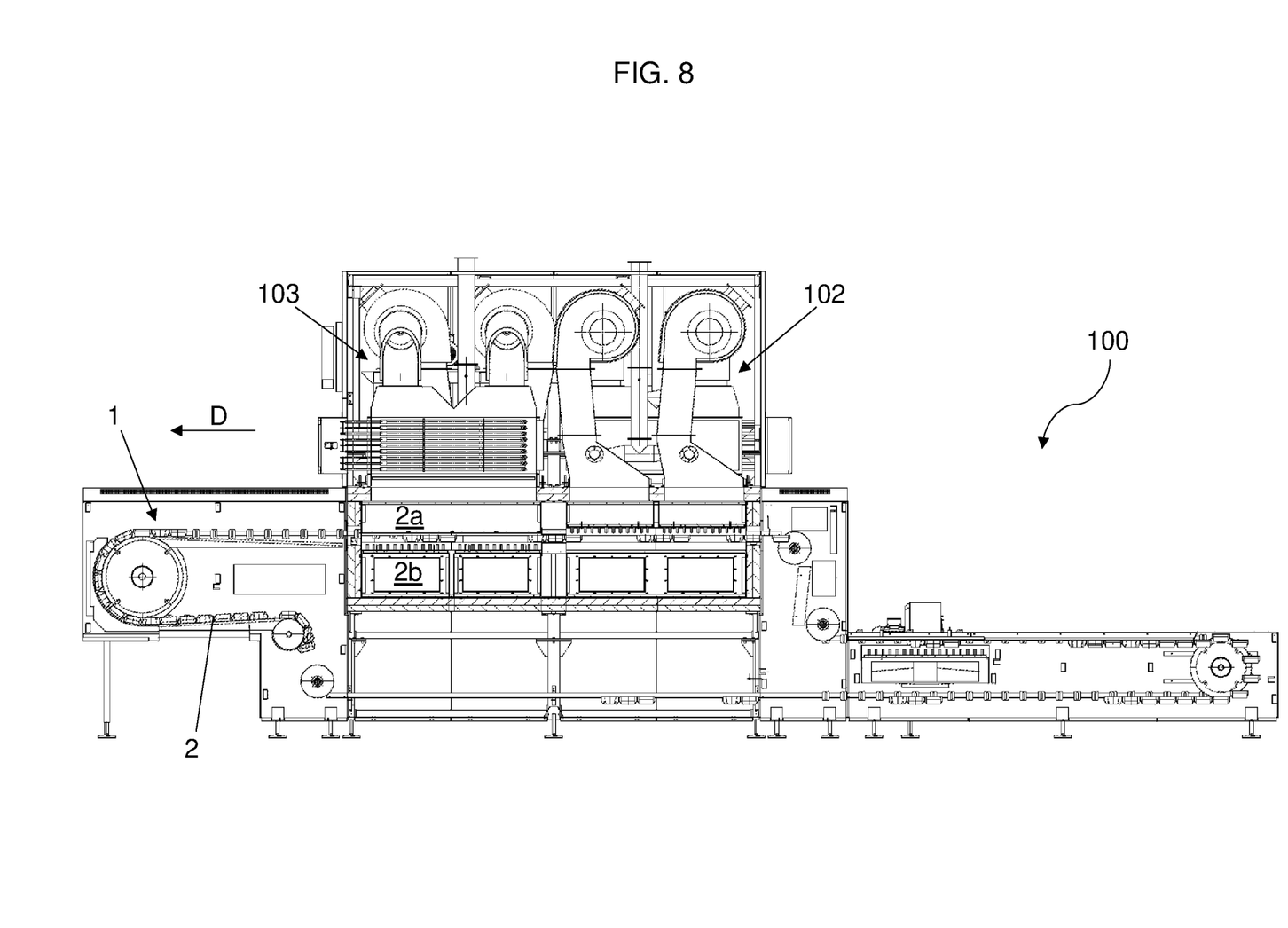
FIG. 8 illustrates a lateral cross-section of a heat treatment apparatus, according to the present invention.

A heat treatment apparatus 100 for food products, according to the present invention, is described below. Preferably, the food products are noodles. Preferably, the noodles are divided in portions or blocks. The portions of noodles may be of any shape, i.e. cubic, parallelepiped, spherical, conical, etc.

The heat treatment apparatus 100 comprises a heating chamber 101.

The heat treatment apparatus 100 comprises a conveying apparatus 1 according to the description above.

The conveyor 2 of the conveying apparatus 1 is arranged to partly pass through the heating chamber 101.

According to a preferred embodiment, the heat treatment apparatus 100 further comprises a first air injecting device 102 configured to introduce into a first part 101a of the heating chamber 101 an upper air flow towards the noodles arranged in the cup-shaped receptacles 8.

The upper air flow has a temperature that is comprised between 100° C. and 300° C.

The upper air flow is directed from a first zone 2a above the conveyor 2 to a second zone 2b under the conveyor 2.

Preferably, the heat treatment apparatus 100 comprises a second air injecting device 103 configured to introduce into a second part 101b of the heating chamber 101 a lower air flow towards the noodles arranged in the cup-shaped receptacles 8.

The lower air flow has a temperature that is comprised between 100° C. and 300° C.

The lower air flow is directed from the second zone 2b to the first zone 2a.

The characteristics of the conveying apparatus for conveying a food product, according to the present invention, emerge clearly from the above description, as do the advantages.

In particular, the sliding mounting of the containers in the endless chains with their pins freely movable within the bores, allows keeping the containers spaced even in changes of direction such as curves. This prevents collisions of the containers.

In addition, the pins are free to rotate along their longitudinal axes, thus the containers can be kept with the bottoms down during the transport, preventing the product fall, but also inverted at the right time to discharge the product.

The containers are kept as close as possible to prevent the air flow from passing in the gaps, that would lower the thermal efficiency.

At the same time, the containers are maintained at an optimized distance that is sufficient to avoid collisions and allows them to travel also in curvilinear path.

The proposed arrangement that allows to keep the height of the cup-shaped receptacles 8 constant avoids the need of a change-over of the components acting on the containers, such as cams and guides. Further, when the conveying apparatus is used in a heat treatment apparatus where hot air is injected from below, the distance from the container and the injection point of the hot air is always the same. Furthermore, the inlet and the outlet can be kept at the same height in order to avoid air leaks.

The invention claimed is:

1. A conveying apparatus for conveying food products, comprising:
a conveyor developing along a closed conveying path, said conveyor comprising a first and second endless chain arranged parallel to each other;
a plurality of containers transversally mounted between said first and second endless chain, each container comprising:
at least one cup-shaped receptacle for a food product;
a first pin and a second pin protruding respectively from opposite ends of the container;
a plurality of pairs of supports, each pair being formed by a first support mounted on the first endless chain and a second support mounted on the second endless chain, each support having a bore dimensioned and shaped for receiving one of said pins, the first pin and the second pin of each container being removably mounted within the bores of one pair of supports
wherein said at least one cup-shaped receptacle comprises a perforated sheet with a plurality of through-holes, the perforated sheet being arranged to define a bottom of the cup-shaped receptacle for resting the food product, and
said at least one cup-shaped receptacle comprises a lateral wall comprising a first plate and a second plate arranged so as to partially overlap in an overlapping zone in correspondence of the bottom, said first plate and second plate being mutually shaped in the overlapping zone so that they create an inner recess for holding the bottom.

2. The conveying apparatus according to claim 1, wherein the first pin and the second pin of each container are slidably mounted within the bores of one pair of supports.

3. The conveying apparatus according to claim 1, wherein the first pin and the second pin of each container are axially rotatably mounted within the bores of one pair of supports.

4. The conveying apparatus according to claim 1, wherein the extension of each bore is larger than the cross-section of the pins.

5. The conveying apparatus according to claim 1, wherein the bore has an elongated development in a direction that is inclined with respect to a transport direction of the conveyor.

6. The conveying apparatus according to claim 5, wherein the bore has an elongated development in a direction substantially orthogonal to the transport direction of the conveyor.

7. The conveying apparatus according to claim 1, wherein the first pin of each container is axially retractable with respect to the corresponding container.

8. The conveying apparatus according to claim 1, wherein the conveyor comprises a plurality of sprockets on which the endless chains are mounted and first guiding means arranged at least at one sprocket and configured to engage the pins of each container and keep them outside the pitch diameter of the sprocket during the rotation of the container around the sprocket.

9. The conveying apparatus according to claim 1, wherein the through-holes have a diameter of between 0.5 and 3 mm.

10. The conveying apparatus according to claim 1, wherein the ratio between empty and full spaces of the perforated sheet is between 0.30 and 0.70.

11. The conveying apparatus according to claim 1, wherein in cross-section the second plate is S-shaped with a first end developing outwards which, together with a free end of the first plate, defines the inner recess.

12. The conveying apparatus according to claim 1, wherein each container comprises a plurality of cup-shaped receptacles arranged in a row along a transverse direction that is orthogonal to a transport direction of the conveyor.

13. A heat treatment apparatus for food products, in particular noodles, comprising:
a heating chamber;
a conveying apparatus according to claim 1,
the conveyor of said conveying apparatus being arranged to partly pass through the heating chamber.

14. The heat treatment apparatus according to claim 13, further comprising:
a first air injecting device configured to introduce into a first part of the heating chamber an upper air flow towards the noodles arranged in the cup-shaped receptacles, the upper air flow having a temperature that is comprised between 100° C. and 300° C. and being directed from a first zone above the conveyor to a second zone under the conveyor, a second air injecting device configured to introduce into a second part of the heating chamber a lower air flow towards the noodles arranged in the cup-shaped receptacles, the lower air flow having a temperature that is comprised between 100° C. and 300° C. and being directed from the second zone to the first zone.

* * * * *

UNITED STATES PATENT AND TRADEMARK OFFICE
CERTIFICATE OF CORRECTION

PATENT NO. : 12,180,008 B2
APPLICATION NO. : 18/696017
DATED : December 31, 2024
INVENTOR(S) : Davide Torni et al.

Page 1 of 1

It is certified that error appears in the above-identified patent and that said Letters Patent is hereby corrected as shown below:

On the Title Page

In Column 2, item [57], Line 4, delete "other:" and insert -- other; --, therefor.

In Column 2, item [57], Line 8, delete "product:" and insert -- product; --, therefor.

Signed and Sealed this
Tenth Day of June, 2025

Coke Morgan Stewart
*Acting Director of the United States Patent and Trademark Office*